Sept. 25, 1928.  W. A. GUNNING  1,685,159
LENS GRINDING MACHINE
Filed April 23, 1925   2 Sheets-Sheet 2

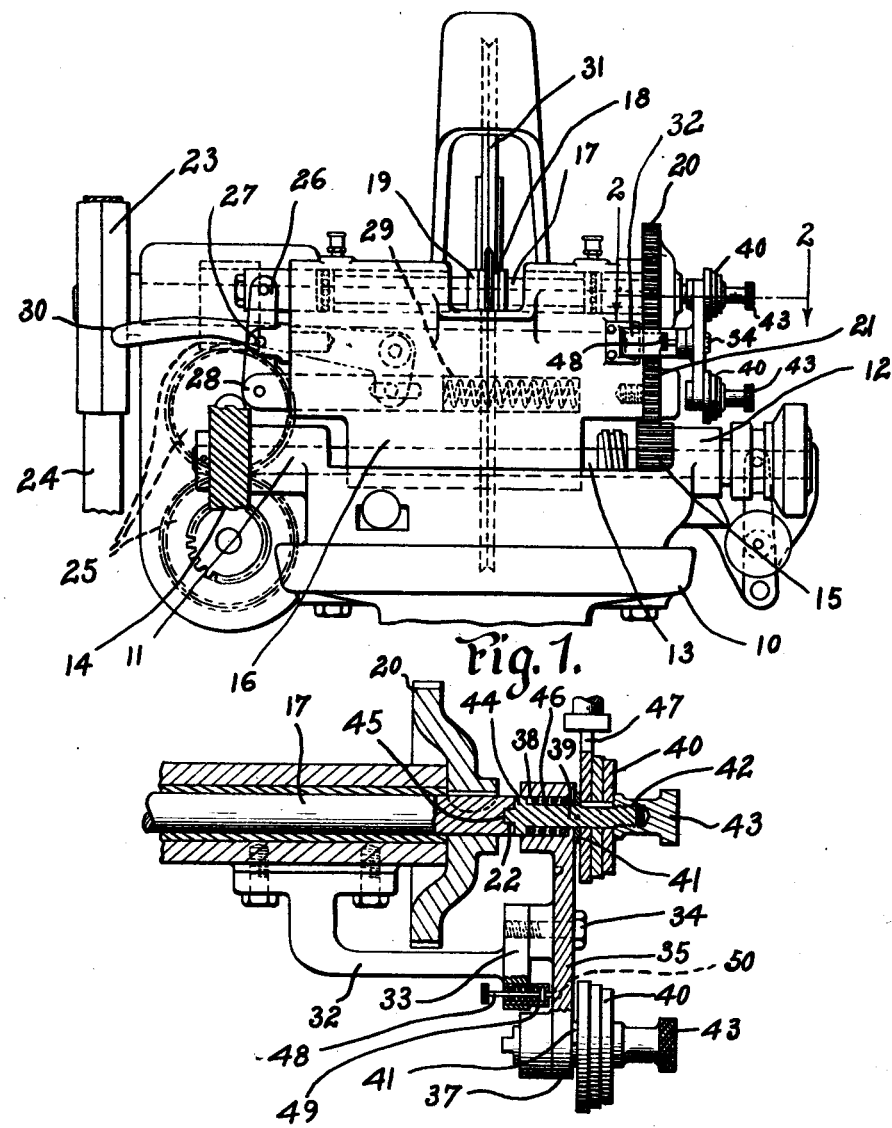

Inventor
William A. Gunning.
By Harry H. Styll.
Attorney

Patented Sept. 25, 1928.

1,685,159

UNITED STATES PATENT OFFICE.

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-GRINDING MACHINE.

Application filed April 23, 1925. Serial No. 25,307.

This invention relates to improvements in optical machinery and more particularly to machines for grinding the edges of vision correcting lenses.

In the production of ophthalmic lenses there are a number of different standard shapes used and it is, therefore, necessary for the ordinary optical prescription shop to be able to produce lenses of different shapes and for this purpose ordinary lens forming machines have been equipped with a number of interchangeable steel formers, the shape of which may be imparted to the lens.

When machines of this character were first made, the majority of them were constructed so as to accommodate but a single former, which was mounted on the lens holding carriage, and in order to grind different shapes of lenses it was necessary to remove one former from the machine and put another one thereon. The constant changing of these formers necessitated the expenditure of a certain amount of time and labor, and furthermore, the output of the machine was consequently somewhat less than it would have been had this constant changing of formers not been required. It was, therefore, found necessary to overcome this disadvantage and a machine having a plurality of interchangeable formers was consequently produced.

When machines equipped with a plurality of interchangeable formers were first produced it was customary to mount a number of them, usually four, directly on the end of the lens holding carriage, so that the shape of either of these formers could be imparted to the lens. While this construction was found to be very successful in its operation, yet, because of the large increase in the number of various standard shapes of lenses used, it was found that even the use of four interchangeable formers necessitated a more or less constant change, which resulted in the loss of time and labor, and it, therefore, became desirable to produce a machine which would accommodate a still larger number of formers than had heretofore been used, in order that they would not have to be changed so often. Furthermore, it was desired to accomplish this object without lengthening the machine, which would have been the case had more formers simply been added to the lens holding carriage.

It is, therefore, the principal object of the present invention to produce a machine of the character stated wherein a sufficient number of formers are used so that the constant changing of these formers will be eliminated.

Another object is to provide a machine having a plurality of batteries of former shapes, each battery being composed of a plurality of formers.

Another object is to provide a machine wherein any one of the batteries of former shapes may be easily and quickly brought into alignment with the lens holding shaft.

Another object is to provide new and novel means for connecting any one of the batteries of former shapes to the lens holding carriage.

Another object is to provide such a machine wherein the plurality of batteries of former shapes are operatable around a common pivot point.

Another object is to provide such a machine wherein each battery of former shapes is operatable independently of the others.

Another object is to provide such a machine wherein the particular former that is being used will always be in axial alignment with the lens holding shaft.

A further object is to provide such a machine wherein means are provided for locking any one of the batteries of former shapes in operative position.

A still further object is to provide such a machine which will be thoroughly efficient and accurate in its operation so that the true shape of the former will at all times be imparted to the lens.

With these and other objects in view the invention resides in the novel features of construction, combination and arrangement of parts hereinafter fully set forth, illustrated in the accompanying drawings, and specifically pointed out in the appended claims.

In the drawings forming a part of this application,

Figure 1 is a view, in elevation, of a machine constructed in accordance with my invention;

Figure 2 is a view, partially in section, showing the manner in which the batteries of former shapes are carried by the machine;

Figure 3:
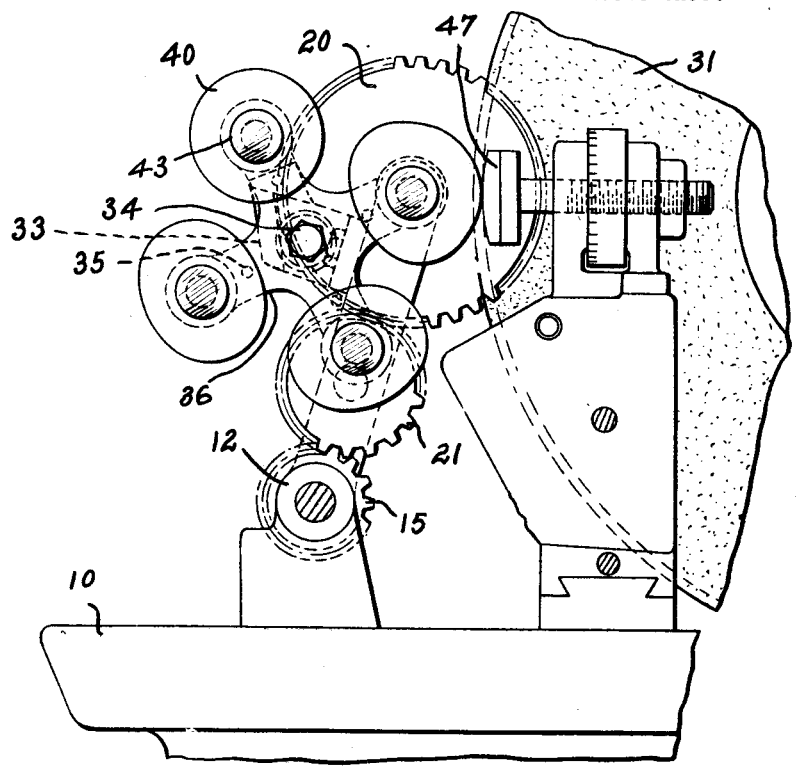
Figure 3 is an end view of a portion of the machine.
Figure 4:
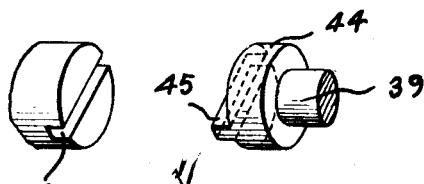
Figure 4 is a detail view showing the connection between the lens holding shaft and the stud shaft which carries a plurality of the formers.

In the drawings, wherein for the purpose of illustration I have disclosed a preferred embodiment of my invention, the numeral 10 designates a base member of any ordinary or preferred construction, upon which are arranged to rest the bearing members 11 and 12, which support the longitudinal shaft 13 carrying the spiral gear 14 at one end thereof and a pinion 15 on the other end. Disposed between the two bearing members 11 and 12 and pivotally mounted upon the shaft 13 is a lens carriage generally designated by the reference character 16. The upper or free end of the carriage 16 contains the lens holding shaft 17, at the inner end of which is a lens clamping pad 18 which is adapted to cooperate with an adjustable lens clamping member 19 in axial alignment therewith. Mounted on the outer end of the lens holding shaft 17 is a gear wheel 20, and positioned between this gear 20 and the pinion 15 and in constant mesh therewith is an idler gear 21. The outer end face of the lens holding shaft is formed with a transverse slot 22, the purpose of which will be hereinafter set forth. The numeral 23 designates a pulley which provides power for the operation of the various parts of the machine, said pulley being driven by a belt 24 which is connected with any source of power that may be desired. The power is conveyed from the pulley 23 to the shaft 13 through the medium of a train of gears 25 which is in mesh with the gear 14 on the longitudinal shaft 13, and thence to the lens holding shaft 17 through the pinion 15 and the gears 20 and 21. Pivotally connected to the outer end of the lens clamping member 19 is a rock lever 26, this lever being fulcrumed as at 27, and having its opposite end secured to the spring pressed plunger 28, partially disposed in a recess 29 formed in the carriage. The plunger is operated through the medium of a pivoted handle member 30, whereby when the same is depressed the plunger 28 will move inwardly and the lens clamping member 19 will be moved away from the lens pad 18. The numeral 31 designates a grinding element of any ordinary or preferred construction, which may be mounted on the machine in any desired manner. Secured to the front face of the carriage 16 and extending longitudinally thereof is a bracket member 32 having a vertically enlarged end face 33, to which is pivotally fastened, as at 34, a plate 35, having the arms 36 radiating therefrom at diametrically opposite points. The outer free end of each of these arms 36 is formed with a somewhat enlarged portion 37 having a counterbored opening 38, in which is rotatably mounted a stub shaft 39.

Carried on the outer end portion of each of the stub shafts 39 are a plurality of former shapes 40, which are held slightly spaced from the arm 36 by means of a washer 41. The outer extremity of the shaft is threaded as at 42 to receive the thumb piece 43 which holds the former shapes tightly against the washer 41, and by means of which the arm 36 may be caused to rotate upon its axis. Positioned adjacent the inner end of each of the said shafts 39 is a collar 44, while the extremity of said shaft is flattened to form a transverse lug 45 which is received within the slot 22 formed in the end of the shaft 17. Contained within the counterbore and bearing against the collar 44 is a coil spring 46, which tends to normally urge and retain the lug 45 within the slot 22, whereby the movement of the shaft 17 will be conveyed to the stub shaft 39, with the result that the steel former shapes are rotated against contact shoes 47 in conventional manner, so that the shape of the former will be imparted to a lens.

In order that I may lock any desired battery of former shapes in operative position, I have provided a spring pressed plunger 48, which is contained within a casing 49 carried by the enlarged face 33 of the bracket member 32, and which is arranged to be received within any one of the depressions 50 formed in the arms 36.

In the operation of my device, and when it is desired to bring any one of the batteries of former shapes into operative position, it is only necessary to pull the stub shaft outwardly, whereby the spring 46 is compressed and the lug 45 disengaged from the slot 22 in the end of the lens holding shaft. Simultaneously with this operation it is also necessary to disengage the spring pressed plunger 48 from the depression 50 in the arm 35. The arms can then be swung around on their axes until the desired set of formers is brought into axial operative position, and when this is done the spring pressed plunger 48 will snap into the depression 50, and it is then only necessary to rotate the stub shaft 39 until the lug 45 comes into alignment with the slot 22 in the lens holding shaft 16, whereupon the action of the spring 46 will cause them to engage.

From the above it will be readily noted that I have produced a simplified yet efficient construction for accomplishing the objects mentioned hereinabove. Any one of the batteries of former shapes may be easily and quickly brought into axial alignment and engagement with the lens holding shaft. It will also be noted that each battery of former shapes is operatable independently of the others.

Obviously, changes may be made in the form, proportions and arrangements of parts, and I reserve the right to make such changes falling within the scope of the claims without departing from the spirit of my invention.

What is claimed is:

1. In a template controlled lens edging machine, the combination with a rotatable lens holding shaft, of a plurality of formers mounted eccentric to the shaft and arranged to be brought selectively into axial alignment with said shaft, and means engaged therewith for rotation with the shaft.

2. In a template controlled lens edging machine, the combination with a rotatable lens holding shaft, of a plurality of formers arranged to rotate about a common pivot point and to be selectively brought into axial alignment and engaged with said shaft to be rotated thereby, and means for holding said former shapes in said aligned position.

3. In a template controlled lens edging machine, the combination with a carriage and a rotatable lens holding shaft carried thereby, of a bracket secured to said carriage, a plurality of formers carried by said bracket and arranged to be selectively brought into engagement with and secured to said shaft for rotation thereby.

4. In a template controlled lens edging machine, the combination with a carriage and a rotatable lens holding shaft carried thereby, of a bracket secured to said carriage, a plurality of formers carried by said bracket and arranged to be selectively brought into alignment with said lens holding shaft, means to engage the formers with the shaft for rotation thereby, and means for locking said formers in operative position.

5. In a template controlled lens edging machine, the combination with a carriage and a rotatable lens holding shaft carried thereby, of a bracket secured to said carriage, a plurality of arms carried by the bracket, and former shapes carried by the arms and arranged to be selectively brought into axial alignment with said lens holding shaft and engaged therewith for rotation thereby.

6. In a template controlled lens edging machine, the combination with a carriage and a rotatable lens holding shaft carried thereby, of a plurality of arms carried by said carriage, former shapes carried by each of said arms and arranged to be selectively brought into axial alignment with said shaft and engaged therewith for rotation thereby, and means for holding said arms in said aligned position.

7. In a template controlled lens edging machine, the combination with a carriage and a rotatable lens holding shaft carried thereby, of a bracket carried by said carriage, a plurality of arms rotatably carried by said bracket, a stub shaft carried by each of said arms, a former shape mounted on each stub shaft, said former shapes being arranged to be selectively brought into axial alignment with said lens holding shaft, and means formed on each of said stub shafts for engagement with said lens holding shaft.

8. In a template controlled lens edging machine, the combination with a carriage and a lens holding shaft carried thereby, of a plurality of arms rotatably carried by said carriage, a stub shaft carried by each of said arms, a former shape mounted on each of said stub shafts, and means formed on each of said stub shafts for engagement with said lens holding shaft.

9. In a template controlled lens edging machine, the combination with a carriage and a lens holding shaft carried thereby, of a bracket secured to said carriage, a plurality of arms rotatably carried by said bracket, a stub shaft carried by each of said arms and arranged for engagement with said lens holding shaft, a former shape mounted on each of said stub shafts and arranged to be selectively brought into axial alignment with said lens holding shaft, and means for locking any one of the said stub shafts in engagement with the lens holding shaft.

WILLIAM A. GUNNING.